United States Patent
Greiner

(10) Patent No.: US 6,481,893 B1
(45) Date of Patent: Nov. 19, 2002

(54) LINEAR ROLL BEARING

(75) Inventor: Heinz Greiner, Ebensbach (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/786,688

(22) PCT Filed: Aug. 19, 1999

(86) PCT No.: PCT/EP99/06074

§ 371 (c)(1),
(2), (4) Date: Mar. 5, 2001

(87) PCT Pub. No.: WO00/15968

PCT Pub. Date: Mar. 23, 2000

(30) Foreign Application Priority Data

Sep. 11, 1998 (DE) .......................... 198 41 667

(51) Int. Cl.$^7$ .............................................. F16C 29/06
(52) U.S. Cl. ........................................... 384/45; 384/43
(58) Field of Search ........................... 384/45, 44, 43; 464/168

(56) References Cited

U.S. PATENT DOCUMENTS

| | | | | |
|---|---|---|---|---|
| 4,514,018 A | * | 4/1985 | Teramachi | 384/45 |
| 4,527,841 A | * | 7/1985 | Teramachi | 384/45 |
| 4,572,590 A | * | 2/1986 | Teramachi | 384/45 |
| 4,869,600 A | * | 9/1989 | Tonogai | 384/43 |
| 5,145,261 A | * | 9/1992 | Narumiya | 384/45 |
| 5,445,455 A | * | 8/1995 | Holweg | 384/13 |
| 5,755,516 A | * | 5/1998 | Teramachi et al. | 29/898.03 |
| 5,911,509 A | * | 6/1999 | Kawaguchi et al. | 384/45 |
| 5,947,605 A | * | 9/1999 | Shirai | 384/45 |
| 5,951,168 A | * | 9/1999 | Teramachi et al. | 384/45 |
| 5,993,064 A | * | 11/1999 | Teramachi et al. | 384/43 |
| 6,113,274 A | * | 9/2000 | Horimoto | 384/43 |
| 6,200,031 B1 | * | 3/2001 | Faulhaber et al. | 384/45 |
| 6,247,846 B1 | * | 6/2001 | Shirai | 384/45 |
| 6,328,474 B1 | * | 12/2001 | Fujiwara et al. | 384/13 |
| 6,347,558 B1 | * | 2/2002 | Miyaguchi et al. | 384/43 |

FOREIGN PATENT DOCUMENTS

| | | | | |
|---|---|---|---|---|
| FR | 474948 | * | 3/1992 | 384/45 |
| JP | 318980 | * | 6/1988 | 384/45 |

* cited by examiner

*Primary Examiner*—Douglas C. Butler
*Assistant Examiner*—Devon Kramer
(74) *Attorney, Agent, or Firm*—Bierman, Muserlian and Lucas

(57) ABSTRACT

A linear rolling bearing comprises a guide carriage (46) that is slidably supported through balls (3) on a guide rail (41). The balls (45) are retained in two guide members (47) that are detachably secured to a base body of the guide carriage (46) covering the upper side of the guide rail (41) and are arranged on longitudinal sides of the guide rail (41) that comprise raceways (50). For each endless circuit of balls, the guide members (47) comprise one raceway (51) for load-bearing balls (45), one return channel (48) for returning balls (45) and two deflecting channels that connect the regions of the load-bearing and returning balls (45) to each other. The guide members (47) are made of an elastic material, and the return channel (48) of each guide member (47) comprises an opening (49) that extends over its entire length and has a width that is smaller than the diameter of the inserted balls (45). According to the invention, the opening (49) also extends over the entire length of the respective deflecting channel, and the deflecting channels and the return channel (48) comprise on their longitudinal sides opposite to the opening (49), a closed bottom that cooperates in the guidance of the balls (45).

7 Claims, 5 Drawing Sheets

LINEAR ROLL BEARING

FIELD OF THE INVENTION

The invention concerns a linear rolling bearing comprising a guide carriage that is slidably supported through balls on a guide rail, the balls being retained in guide members that are detachably secured to the guide carriage while being arranged on longitudinal sides of the guide rail that comprise raceways, said guide members comprising for each endless circuit of balls, one raceway for load-bearing balls, one return channel for returning balls and two deflecting channels that connect the regions of the load-bearing and returning balls to each other, and the return channel of each guide member comprising an opening that extends over an entire length of the return channel and has a width that is smaller than the diameter of the inserted balls.

BACKGROUND OF THE INVENTION

In linear rolling bearings with an unlimited travel, the task of leading the rolling elements out of the load-bearing zone, their deflection and return and re-leading into the load-bearing zone together with the reliable retention of the balls in the unassembled state of the carriage poses a problem that is difficult to resolve. Usually, inner deflector elements, outer deflector elements and retaining crossbars are used that can lead to disturbances at their junction points and at the transition to the carrier body because, due to the great number of individual parts, the formation of an edgeless circuit is rendered more difficult. Besides this, the great number of parts results in higher tool, storage and assembly costs. The exact positioning of the deflector elements relative to the rolling element-supporting parts of the guide carriage is often an unsatisfactory compromise with economy.

Besides profiled rail guides with a plurality of separate parts, profiled rail guides with integrally formed inner deflectors and plastic-lined returning members are also known. This results in the formation of an almost edgeless circuit. Drawbacks of such configurations are the very high tool costs that result from the sealing required relative to load-bearing raceways and environment, the problem of inserting and removing of the finished part out of the hot mold and the costs caused by sealing and positioning surfaces on the part comprising the load-bearing raceways.

The publication DE 33 04 895 C2 discloses a linear rolling bearing in which the ball recirculating shoe or bearing body has attached sheet metal parts, viz., a W-shaped ball retainer for the load-bearing balls and a cover with a U-shaped cross-section that closes ball guide tracks for the non-loaded returning balls on the outside. Due to these additional sheet metal parts, the construction and assembly of the ball recirculating shoe are expensive and complex.

From the publication DE 30 19 131 A1, a linear rolling bearing of the initially cited type is known in which the guide members made as retaining plates comprise in the ball-returning regions, longitudinally extending continuous openings that form the return channels. Therefore, each guide member not only has a narrowed, outwardly oriented opening but is also open towards the machine element that acts as a guide carriage. The balls extend through these openings and are guided on longitudinal raceways that have to be made as grooves in the machine element so that additional machining and tool costs are incurred.

SUMMARY OF THE INVENTION

The object of the invention is to provide a linear rolling bearing with the smallest possible number of attached parts that is very similar to a bearing with integrally formed or sprayed-on plastic regions but does not have the drawbacks of high tool costs and costs of making sealing surfaces on the carrier body and of spraying.

This object is achieved according to the invention by the fact that the opening also extends over the entire length of the respective deflecting channel, and the deflecting channels and the return channel comprise on their longitudinal sides opposite to the opening, a closed bottom that cooperates in the guidance of the balls. Thus, the circuit raceways comprise a closed bottom on one side and the channels are narrowed down on the side opposite to the bottom so that the balls are wholly guided in a channel and cannot be displaced sideways nor in vertical direction.

During circulation, the rolling elements are in contact with at least three points of a guide member. Thus, the precision obtained in connection with the centerings is comparable to that obtained by spraying in a mold with an exactly fixed carrier body. Especially at the inlet into the load-bearing zone, the ball enters the circular cross-section of the load-bearing zone formed by the guide carriage and the rail without lateral or vertical offset. The roof-shaped inclination directly on the load-bearing raceways of the guide carriage therefore also assures an exact positional correspondence. This centering, preferably ground together with the load-bearing raceways, assures that at the most vital point, i.e. at the transition from the deflecting into the load-bearing zone, a measurable offset hardly ever occurs. Even directly at the transition to the carrier body, the central raised edge on the inner side of the deflector prevents an upward displacement of the balls.

The invention has the further advantage that only one single plastic or metal part has to be attached to the carrier body or guide carriage for each longitudinal side of the guide rail, which part comprises complete deflecting raceways and the ball retainer, or complete deflecting raceways, return channels and the ball retainer and is closed by two identical covers, and which, by an exact positional correspondence to the load-bearing raceways through a support on three points by over-dimensioning leads to the formation of an almost edgeless circuit exactly positioned with regard to the load-bearing raceways.

The invention provides a bearing having circuit regions that through appropriate undercuts enable the rolling elements to be deflected, guided back and prevented from falling out before or during assembly by one single component. This component can be made of a plastic or a metal.

The linear rolling bearing can be configured as a four-row ball bearing for guide carriages having two load-bearing regions, or as a two-row ball bearing for carriages supported only on one side of a rail. In the case of guides having raceways situated very close to each other, a convex lug can be formed between or next to two adjacent load-bearing raceways on the crossbars containing these raceways, or directly on the carriage if this is supported only on one side. If the raceways are situated further apart from each other, the fixing contour may also be concave or have a rectangular cross-section. If the spacing on the carrier body is larger than on the guide member, an exact fixing can be achieved by chamfers or countersinks on the return bores in the case of bored return channels, or by fixing contours in the case of return channels not made by boring. Besides this, due to their positive engagement, the parts are safe against displacement when subjected to impacts, so that a change in the channel cross-section cannot occur for this reason. The deflecting and guide member may also be made up of two parts that may be joined to each other, for example, by ultrasonic welding. Four-, six- or eight-row guides can be made in this way.

BRIEF DESCRIPTION OF THE DRAWINGS

Examples of embodiment are illustrated in the drawing and will be described more closely in the following.

DETAILED DESCRIPTION OF THE DRAWINGS

Figure 1:
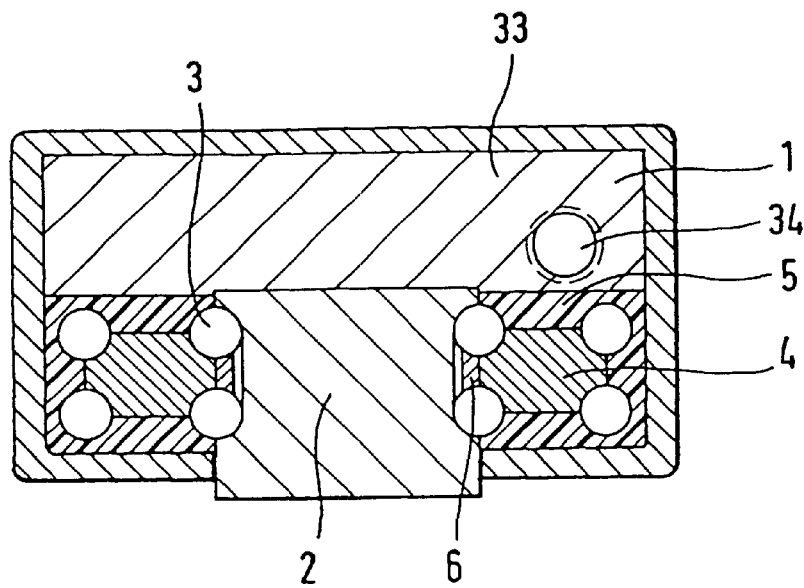
FIG. 1 is a cross-section through a jointed prior art bearing.

A prior art linear rolling bearing illustrated in FIG. 1 comprises a guide rail 2 and a guide carriage 1 that is supported on the rail 2 through balls 3 and can travel in the longitudinal direction of the rail. The guide carriage 1 has a base body 33 covering and partly surrounding the guide rail 2, and two inner deflectors 4, two outer deflectors 5 and one retaining crossbar 6 per raceway side. The inner deflectors 4 are aligned during assembly and fixed through the outer deflectors 5 on the base body 33 by screws 34. The retaining crossbar 6 is inserted into the outer deflectors 5.

Figure 2:
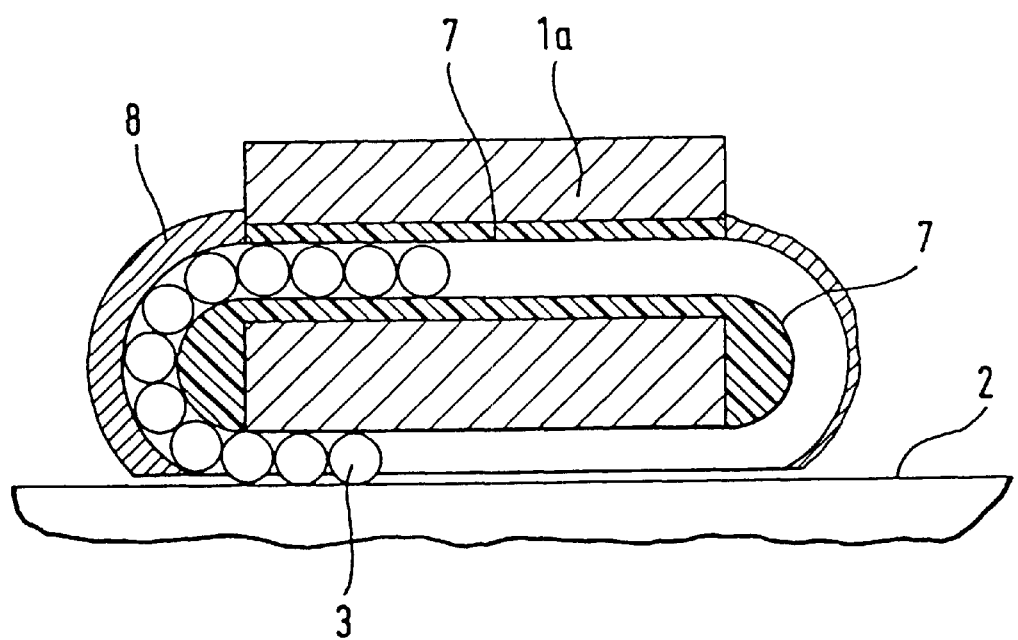
FIG. 2 is a longitudinal section through a sprayed bearing having inner deflectors and return raceways.

A prior art linear rolling bearing illustrated in FIG. 2 shows a guide carriage la that is supported through balls 3 on the guide rail 2 and has a guide contour 7 edgelessly formed thereon by spraying. A cover 8 closes the raceway channel 8 on each side.

Figure 3:
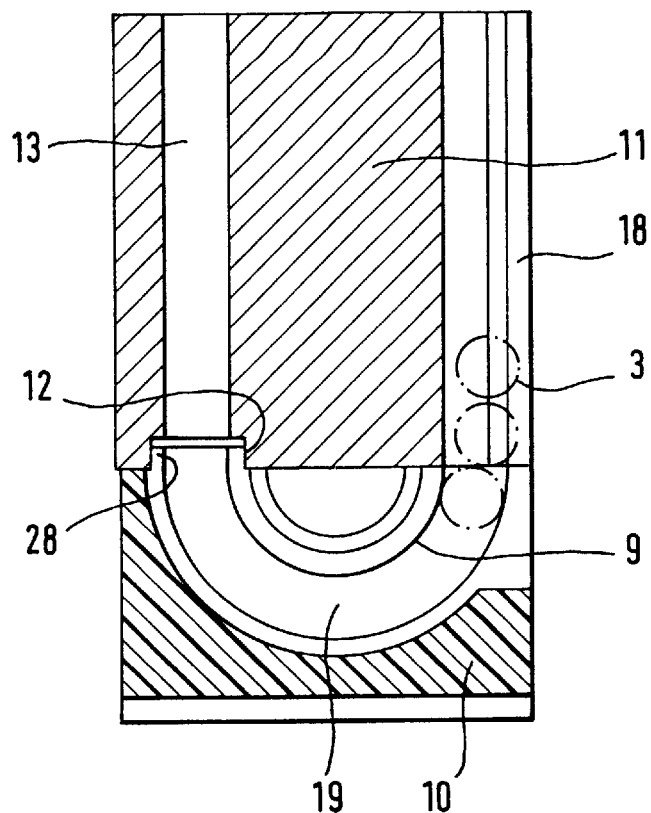
FIG. 3 is a partial orthogonal longitudinal section through a bearing according to the invention.

In contrast to these two prior art linear rolling bearings, FIG. 3 shows a linear rolling bearing according to the invention in which a carrier section 11 comprises a one-piece guide member 9 having two deflecting raceways 9 and a retaining crossbar 18. The cover 10 closes the space of the raceways of the guide member 9. Extensions 28 on the guide member 9 center and fix the guide member 9 in recesses 12 (countersinks) into which the extensions 28 are inserted on the carrier section 11 comprising return channels 13.

Figure 4:
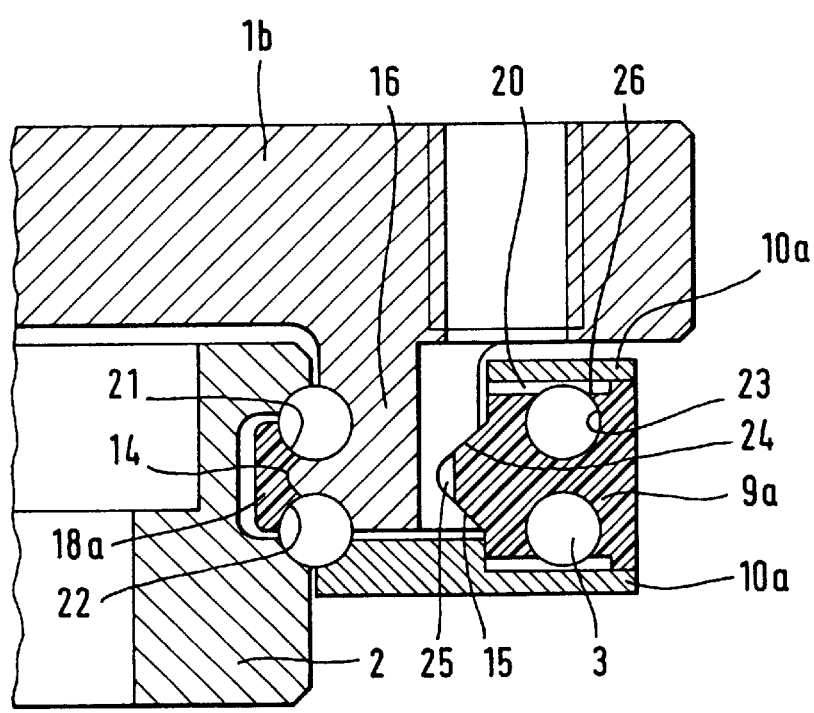
FIG. 4 is a cross-section through a four-row bearing according to the invention.

FIG. 4 shows a four-row linear bearing according to the invention in which each guide member 9a comprises two edgelessly formed channels which effect the deflection and return of the balls 3. The retention of the balls 3 is achieved in that the return raceways and/or the deflecting raceways comprise a narrowing 26 on the top and on the bottom. A retaining crossbar 18a is edgelessly formed on the load-bearing raceway side. The guide member 9a is fixed and retained on a carrier body section 16 through a recess 25 and inclinations 24, and through curves 21 and 22 that are formed on the retaining crossbar 18a and engage a lug 14. The channels 23 are closed by covers 10a that may be split lengthwise or crosswise and define a large space 20 for lubricant.

Figure 5:
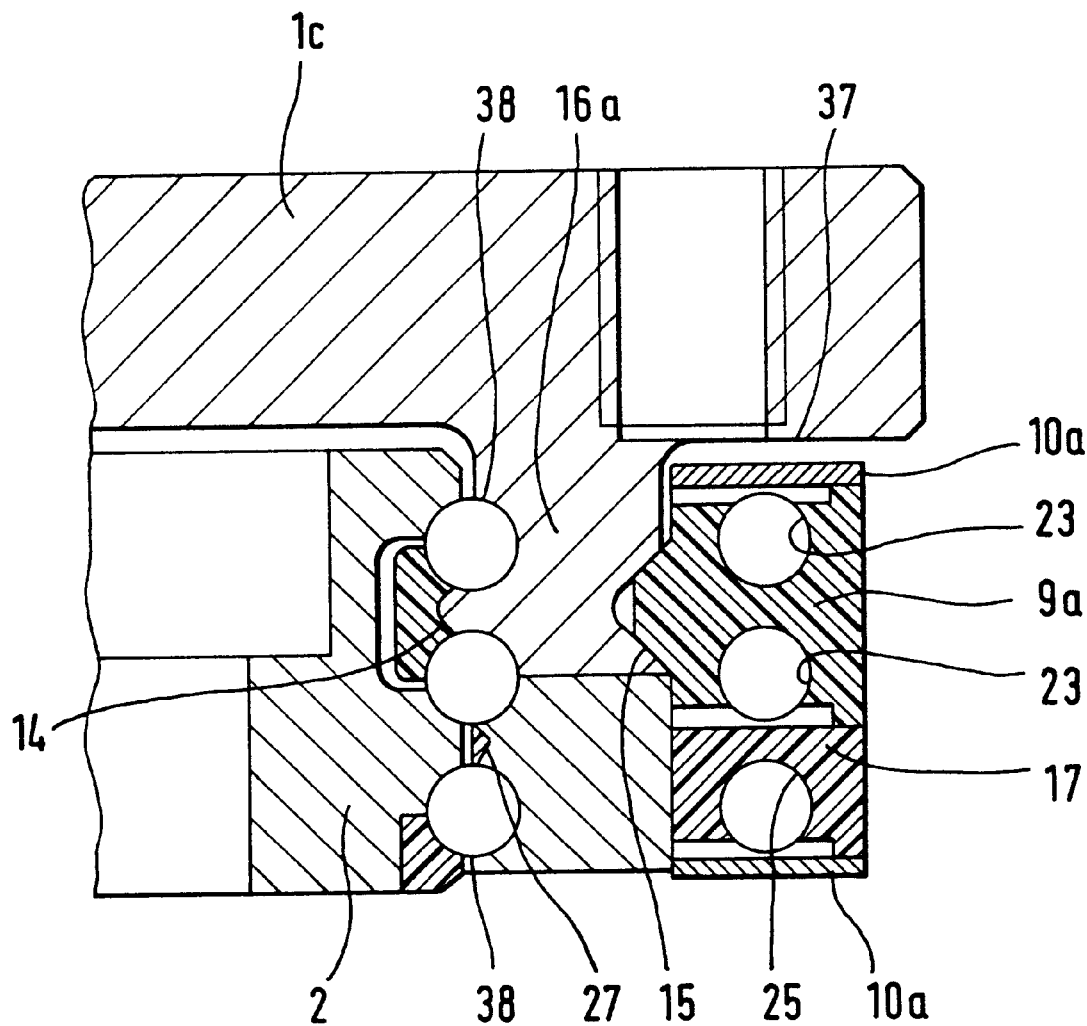
FIG. 5 is a cross-section through a six-row bearing according to the invention.
Figure 7:
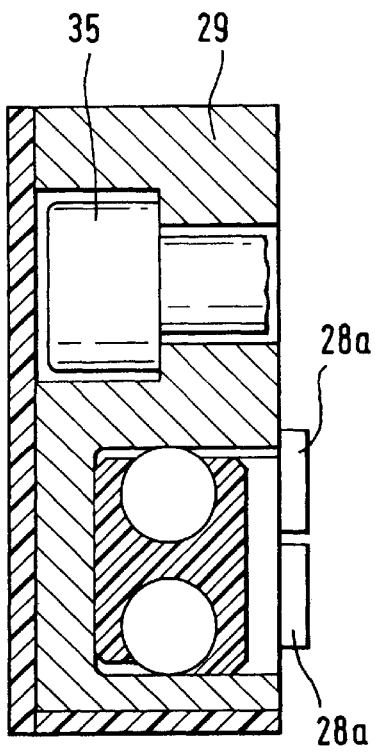
FIG. 7 is a partial cross-section through a bearing of the invention according to FIG. 6.

FIG. 5 shows a six-row linear rolling bearing according to the invention that comprises, under a retaining edge 37 of the guide carriage 1c, a guide member 9a having continuous circuit raceways similar to FIG. 4 and, additionally, a narrowed guide element 17 open on one side which is a complete component comprising deflecting raceways and one return raceway and is fixed on the guide member 9a. An additional centering 27 on the carrier body section 16a can improve the position relative to this. The channels 23 are closed by covers 10a.

Figure 6:
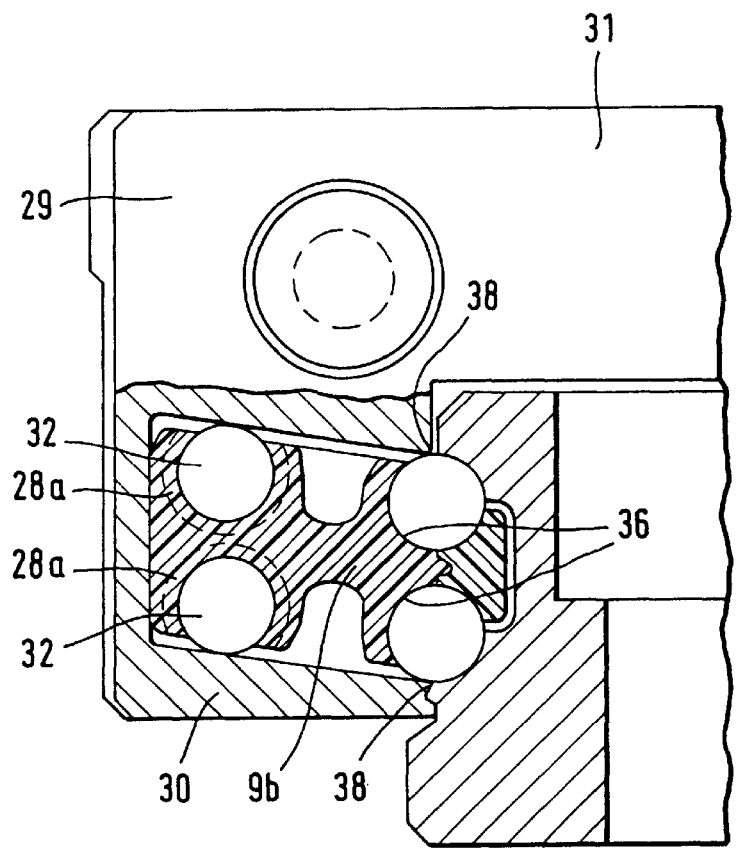
FIG. 6 is an end view of a bearing of the invention according to FIG. 3.

FIG. 6 shows a four-row linear rolling bearing according to the invention in which a carrier body 31 with a carrier raceway section 30 has bored return channels 32 and a narrowed guide member 9b comprising deflecting raceways and a retaining crossbar and at least partially peripheral extensions 28a that engage recesses (countersinks) of the return bores. A cover 29 comprises screws 35 for fixing the guide member 9b on the carrier body 31.

Figure 8:
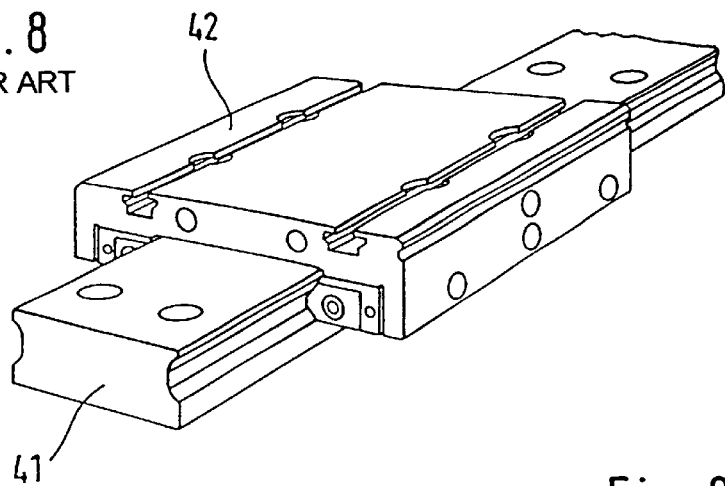
FIG. 8 is a perspective representation of a further prior art linear rolling bearing.
Figure 9:
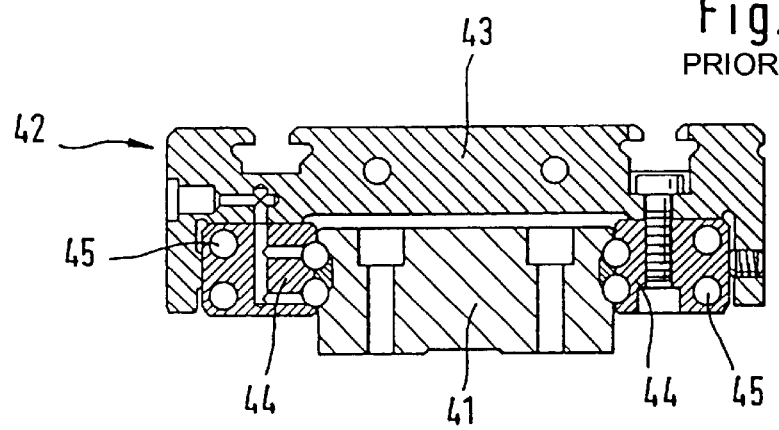
FIG. 9 is a cross-section through the linear rolling bearing of FIG. 8

A prior art linear rolling bearing illustrated in FIGS. 8 and 9 comprises a guide rail 41 and a guide carriage 42 that is supported on the rail and can travel in longitudinal direction thereof. The guide carriage 42 has a base body 43 that covers and partly surrounds the guide rail 41. Two ball recirculating shoes 44 are detachably secured on the base body 43 while being arranged on the two longitudinal sides of the guide rail 41 on which they are supported through balls 45. The balls 45 in each ball recirculating shoe 44 are arranged in two endless circuits each of which contains a load-bearing row of balls, a returning row of balls and two deflecting rows of balls connecting these rows to each other. Reception channels in the form of bores parallel to the longitudinal direction of the guide rail are made for the returning rows of balls in the ball recirculating shoes 44.

Figure 10:
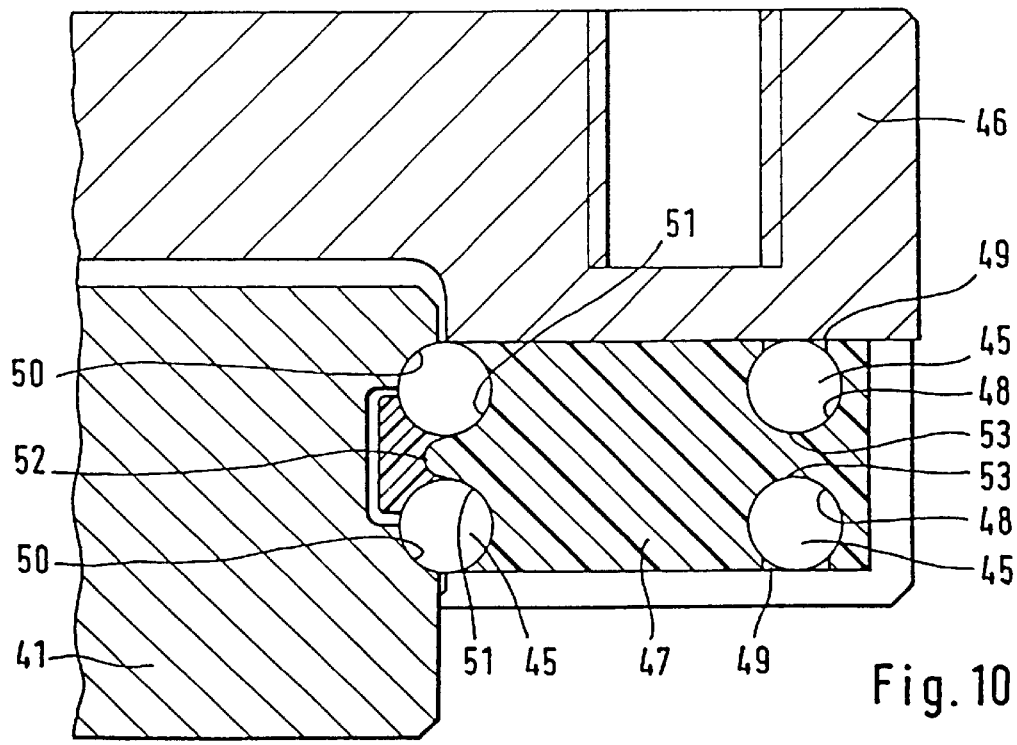
FIG. 10 is a schematic representation of a partial cross-section through a linear rolling bearing according to the invention.

In contrast to this prior art linear rolling bearing, FIG. 10 shows a linear rolling bearing according to the invention in which the guide carriage 46 comprises guide members 47 each of which has two return channels 48 that are open towards the outside. Each return channel 48 has an inner diameter corresponding to the diameter of the balls 45 and a radial opening 49 that extends in the longitudinal direction of the guide rail and is made with a width that is smaller than the ball diameter. According to the invention, the return channel 48 has on its longitudinal side situated opposite to the opening 49, a closed bottom 53 that cooperates in the guidance of the balls 45 so that the balls 45 are retained in the return channel 48 of the guide member 47 even when this is removed from the guide carriage 46. In this way, the balls 45 are reliably retained in the return channels 48. The guide members 47 can be made as an elastic component out of a plastic or a metal. Due to the openings 49, it can be manufactured well with its return channels 48 in a mold.

The load-bearing balls 45 are supported on raceways 50 of the guide rail and on raceways 51 of the guide member 47. Between the two raceways 51, the guide member 47 comprises a lug 52 which assures its exact fixation and retention in the bearing.

REFERENCE NUMERALS

1 Guide carriage
1a Guide carriage
1b Guide carriage
1c Guide carriage

2 Guide rail
3 Ball
4 Inner deflector
5 Outer deflector
6 Retaining crossbar
7 Guide contour
8 Cover
9 Guide member
9a Guide member
9b Guide member
10 Cover
10a Cover
11 Carrier section
12 Recess (Countersink)
13 Return channel
14 Lug
15 Inclination
16 Carrier body section
16a Carrier body section
17 Guide element
18 Retaining crossbar
18a Retaining crossbar
19 Deflecting raceway
20 Space for lubricant
21 Curve
22 Curve
23 Channel
24 Inclination
25 Recess
26 Narrowing
27 Centering
28 Extension
28a Extension
29 Cover
30 Carrier raceway section
31 Carrier body
32 Return channel
33 Base body
34 Screw
35 Screw
36 Load-bearing raceway
37 Retaining edge
38 Retaining contour
41 Guide rail
42 Guide carriage
43 Base body
44 Ball recirculating shoe
45 Ball
46 Guide carriage
47 Guide member
48 Return channel
49 Opening
50 Raceway of the guide rail
51 Raceway of the guide member
52 Lug
53 Bottom

What is claimed is:

1. A linear rolling bearing comprising a guide carriage that is slidably supported through balls on a guide rail; the balls being retained in guide members that are detachably secured to the guide carriage while being arranged on longitudinal sides of the guide rail that comprise raceways; said guide members comprising for each endless circuit of balls, one raceway for load-bearing balls, one return channel for returning balls and two deflecting channels that connect the regions of the load-bearing and retaining balls to each other, and the return channel of each guide member comprising an opening that extends over an entire length of the return channel, has a width that is smaller than the diameter of the inserted balls, the opening also extending over the entire length of the respective deflecting channel, and the deflecting channels and the return channel comprising on their longitudinal sides opposite to the opening, a closed bottom that cooperates in the guidance of the balls wherein in a region of deflection and return, or only in the region of deflection of the balls in the guide member, the opening is formed by narrowing of the channels that retains and guides the balls, while in and the region of a load-bearing raceway of the guide member retention is effected by a retaining crossbar whose distance from a retaining contour is smaller than the diameter of the balls.

2. A linear rolling bearing according to claim 1, wherein the guide member is made of an elastic plastic.

3. A linear rolling bearing according to claim 1, wherein the guide member is made of metal and the narrowing is formed by plastic shaping.

4. A linear rolling bearing according to claim 1, wherein a round, concave or convex recess is made in the guide carriage between the load-bearing raceways.

5. A linear rolling bearing according to claim 4, wherein extensions are made on the guide member so that, between the concave, convex or round recess and the recesses of the return bores, freedom from play or pre-stress is established by the extensions between the guide member and the carrier body.

6. A linear rolling bearing according to claim 4, wherein the guide member (9a,9b) comprises inclinations (24) that engage into a recess (25) comprising inclinations (15) and together with curves (21,22) establish freedom from play or pre-stress between the guide member (9a,9b) and the guide carriage (1b,1c) or the guide carriage (31).

7. A linear rolling bearing according to claim 1, wherein a further guide element (17) comprising one or two circuits is secured to the guide member (9a,9b).

* * * * *